(12) United States Patent (10) Patent No.: US 12,445,665 B2
Kawashima et al. (45) Date of Patent: Oct. 14, 2025

(54) VIDEO QUALITY ESTIMATION APPARATUS, VIDEO QUALITY ESTIMATION METHOD, AND PROGRAM

(71) Applicant: NTT, Inc., Tokyo (JP)

(72) Inventors: Kimiko Kawashima, Tokyo (JP); Noritsugu Egi, Tokyo (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/293,135

(22) PCT Filed: Jul. 13, 2022

(86) PCT No.: PCT/JP2022/027576
§ 371 (c)(1),
(2) Date: Jan. 29, 2024

(87) PCT Pub. No.: WO2023/021890
PCT Pub. Date: Feb. 23, 2023

(65) Prior Publication Data
US 2025/0080783 A1  Mar. 6, 2025

(30) Foreign Application Priority Data

Aug. 18, 2021 (WO) .................. PCT/JP2021/030205

(51) Int. Cl.
*H04N 21/24* (2011.01)
(52) U.S. Cl.
CPC ................................ *H04N 21/2402* (2013.01)
(58) Field of Classification Search
CPC .... H04N 21/2402; H04N 7/15; H04N 21/237; H04N 21/24
See application file for complete search history.

(56) References Cited

U.S. PATENT DOCUMENTS

| | | | |
|---|---|---|---|
| 8,544,056 B2* | 9/2013 | Ohno | H04N 21/4622 348/588 |
| 10,931,979 B2* | 2/2021 | Han | H04N 21/2402 |
| 11,412,283 B1* | 8/2022 | Kwong | G06N 20/00 |
| 11,483,368 B1* | 10/2022 | Kwong | H04L 65/80 |
| 2002/0021260 A1* | 2/2002 | Meguro | H04N 5/45 345/1.3 |
| 2005/0035886 A1* | 2/2005 | Labelle | H04N 21/25808 375/E7.176 |
| 2006/0165169 A1* | 7/2006 | Ng | H04N 19/537 375/E7.146 |
| 2008/0129877 A1* | 6/2008 | Ohno | H04N 21/4398 348/E9.037 |
| 2012/0281142 A1* | 11/2012 | Pettersson | H04N 17/004 348/553 |

(Continued)

OTHER PUBLICATIONS

Takanori Hayashi, NTT Network Technology Laboratory, "QoE-centric operation to optimize user experience quality," NTT Technical Journal, vol. 27, No. 7, pp. 16 to 19, Jul. 2015.

(Continued)

*Primary Examiner* — Javier O Guzman
(74) *Attorney, Agent, or Firm* — IPUSA, PLLC

(57) ABSTRACT

In a video quality estimation apparatus for estimating a video quality of a video having a screen layout in which parts are arranged, the video quality of the video is estimated based on a video quality of each of the parts forming the video and a layout resolution of each of the parts on the screen layout.

8 Claims, 18 Drawing Sheets

(56) References Cited

U.S. PATENT DOCUMENTS

| | | | |
|---|---|---|---|
| 2016/0142752 A1* | 5/2016 | Ohno | H04N 21/2402 |
| | | | 725/116 |
| 2017/0244991 A1* | 8/2017 | Aggarwal | G06V 20/46 |
| 2018/0160160 A1* | 6/2018 | Swaminathan | H04N 21/816 |
| 2018/0191868 A1* | 7/2018 | Wang | H04N 19/70 |
| 2018/0241988 A1* | 8/2018 | Zhou | H04N 21/6125 |
| 2019/0082339 A1* | 3/2019 | Dion | H04N 21/64738 |
| 2019/0238856 A1* | 8/2019 | Dasari | G06T 7/00 |
| 2019/0297363 A1* | 9/2019 | Chirokov | H04N 21/23439 |
| 2019/0310472 A1* | 10/2019 | Schilt | G06F 3/015 |
| 2019/0356894 A1* | 11/2019 | Oh | H04N 21/234345 |
| 2020/0296331 A1* | 9/2020 | Jung | H04L 65/80 |
| 2022/0058397 A1* | 2/2022 | Lee | G06V 10/443 |
| 2022/0182601 A1* | 6/2022 | Kondamari | H04N 21/2187 |

OTHER PUBLICATIONS

International Telecommunication Union, "Parametric bitstream-based quality assessment of progressive download and adaptive audiovisual streaming services over reliable transport", Models and tools for quality assessment of streamed media, Recommendation ITU-T P. 1203, 2017, pp. 1 to 14.

\* cited by examiner

Fig. 5

| MATCH SCREEN | MATCH SCREEN | COUNTRY NAME |
|---|---|---|
| MATCH SCREEN | MATCH SCREEN | PLAYER NAME |
| A COUNTRY 0 − 0 B COUNTRY | | |

IN CASE OF FRAME RATE OF 30 fps AND RESOLUTION OF 1080 P (4) FACES OF 16 PEOPLE ON GRID OF 4X4 (SIZE OF EACH FACE IS 1/16 OF 1080 P)

(3) FACES OF 9 PEOPLE ON GRID OF 3X3 (SIZE OF EACH FACE IS 1/9 OF 1080 P)

(2) FACES OF 4 PEOPLE ON GRID OF 2X2 (SIZE OF EACH FACE IS 1/4 OF 1080 P)

(1) FACE OF 1 PERSON IN WHOLE SCREEN (SIZE OF FACE IS 1080 P)

VIDEO QUALITY ESTIMATION APPARATUS, VIDEO QUALITY ESTIMATION METHOD, AND PROGRAM

TECHNICAL FIELD

The present invention relates to video quality estimation.

BACKGROUND ART

The size of a Web conference service market is expanding due to expansion of remote work and remote lessons. Although it is important for Web conference service providers to allow users to continue to use their services in a satisfactory way, it is known that user satisfaction decreases when the video quality of Web conference services deteriorates.

NPL 1 discloses, in the case of video distribution services, in order to improve the quality of experience (QoE), a technique of estimating a video quality from encoded information and visualizing the QoE, thereby intensively improving an area in which the QoE is reduced. In estimating a video quality, there has been proposed a technique of estimating the video quality on the basis of encoding information such as an encoding method, a distribution bit rate, a resolution, and a frame rate.

CITATION LIST

Non Patent Literature

NPL 1: Takanori Hayashi, "QoE-centric operation to optimize user experience quality," NTT Technical Journal, vol. 27, No. 7, pp. 16 to 19, July 2015.

SUMMARY OF INVENTION

Technical Problem

Similarly, with respect to Web conference services, in order to visualize QoE for improving the QoE, techniques for estimating the video quality of Web conference services are required. However, a video displayed on a terminal in a Web conference has a screen layout in which parts are arranged and has different characteristics from a video displayed on a terminal in video distribution services not having such a screen layout, and thus, when a conventional video quality estimation technique (a video quality estimation model) for video distribution services is applied to a Web conference video, quality estimation cannot be performed with high accuracy.

In addition, the above problem is not limited to a video of a Web conference, and may occur in all videos having a screen layout in which parts are arranged.

The present invention has been made in view of the above points, and an object thereof is to provide a technique for estimating quality of a video having a screen layout in which parts are arranged with high accuracy.

Solution to Problem

According to the disclosed technique, there is provided a video quality estimation apparatus that estimates a video quality of a video having a screen layout in which parts are arranged, wherein the video quality of the video is estimated on the basis of based on a video quality of each of the parts forming the video and a layout resolution of each of the parts on the screen layout.

Advantageous Effects of Invention

According to the disclosed technique, the quality of the video having the screen layout in which parts are arranged can be estimated with high accuracy. For example, the video quality in the Web conference can be estimated with high accuracy.

BRIEF DESCRIPTION OF DRAWINGS

FIG. 5 is a diagram showing an example of a screen layout in which parts are arranged.

DESCRIPTION OF EMBODIMENTS

An embodiment of the present invention (the present embodiment) will be described below with reference to the drawings. The embodiment described below is merely exemplary and embodiments to which the present invention is applied are not limited to the following embodiment.

In the following description, an embodiment will be mainly described by taking a video of a Web conference as an example of an application field of the present invention, but the technique according to the present embodiment is not limited to a video of a Web conference, and is applicable to all videos having a screen layout in which parts are arranged. Also, a "Web conference video quality estimation apparatus" described in the following embodiment may be called a "video quality estimation apparatus."

(System Configuration)

Figure 1:
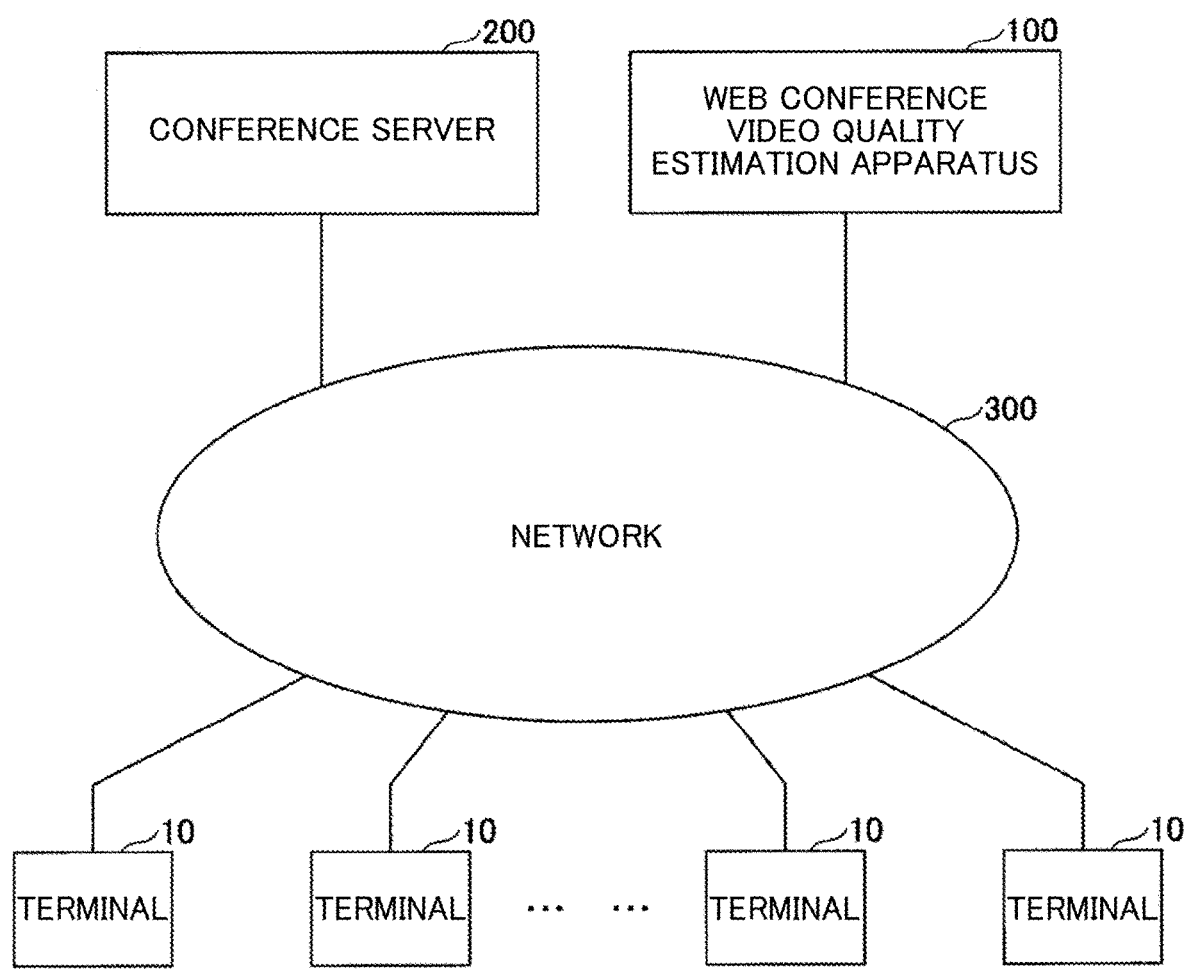
FIG. 1 is an overall configuration diagram of a system according to an embodiment of the present invention.

FIG. 1 shows an example of an overall configuration of a system according to an embodiment of the present invention. As shown in FIG. 1, the present system includes a plurality of terminals 10 (which may be called clients), a Web conference video quality estimation apparatus 100, and a conference server 200.

The terminals 10 are general terminals in which a Web browser operates, and are, for example, PCs, smartphones, and the like. The conference server 200 is a server having a server function for a Web conference, and in the present embodiment, it is assumed that the conference server 200 has a server function of a WebRTC SFU. Based on control of the conference server 200, a Web conference is performed between the plurality of terminals 10. In addition, when the technique according to the present embodiment is applied to a video other than the Web conference, the conference server 200 is replaced with a video distribution server for distributing a video other than the conference video, for example.

The Web conference video quality estimation apparatus 100 is an example of an apparatus that incorporates the technique according to the present invention, and estimates the quality of a Web conference video displayed on the terminals 10. Also, the Web conference video quality estimation apparatus 100 may be a single apparatus, a function built into the terminals 10, or a function built into the conference server 200. When the function of the Web conference video quality estimation apparatus 100 is built into the terminals 10, each of the terminals 10 may be called the Web conference video quality estimation apparatus 100. When the function of the Web conference video quality estimation apparatus 100 is built into the conference server 200, the conference server 200 may be called the Web conference video quality estimation apparatus 100.

(Regarding Problems and Examples of Screen Layout)

As described above, a video displayed on a terminal in a Web conference is different from a video displayed on a terminal in a video distribution service for a video that does not have a screen layout in which parts are arranged, and thus, when a conventional video quality estimation technique (a video quality estimation model) for such a video distribution service is applied to a Web conference video, quality estimation cannot be performed with high accuracy. In this respect, more specifically, there are the following two problems.

The first problem is that a video displayed on a terminal in a Web conference is limited differently from a video displayed in a video distribution service for a video that does not have a screen layout in which parts are arranged. In the case of such a video distribution service, since various videos are displayed, video quality estimation techniques have been constructed to reflect encoding characteristics of various videos having different video resolutions and motion magnitudes.

However, the video displayed in the Web conference is limited, and a face video of a participant and a material video (for example, a meeting materials image, a moving image, or the like) are mainly displayed. The face video has many movements such as nodding and gestures. On the other hand, the material video includes a motion only at the timing of page turning and has many time periods of still images. In this way, characteristics of the face video and the material video are different from each other, and thus, in order to estimate a video quality with higher accuracy, a quality estimation model reflecting encoding characteristics of the face video and the material video is required. Also, both the face video and the material video are examples of parts.

Figure 2:
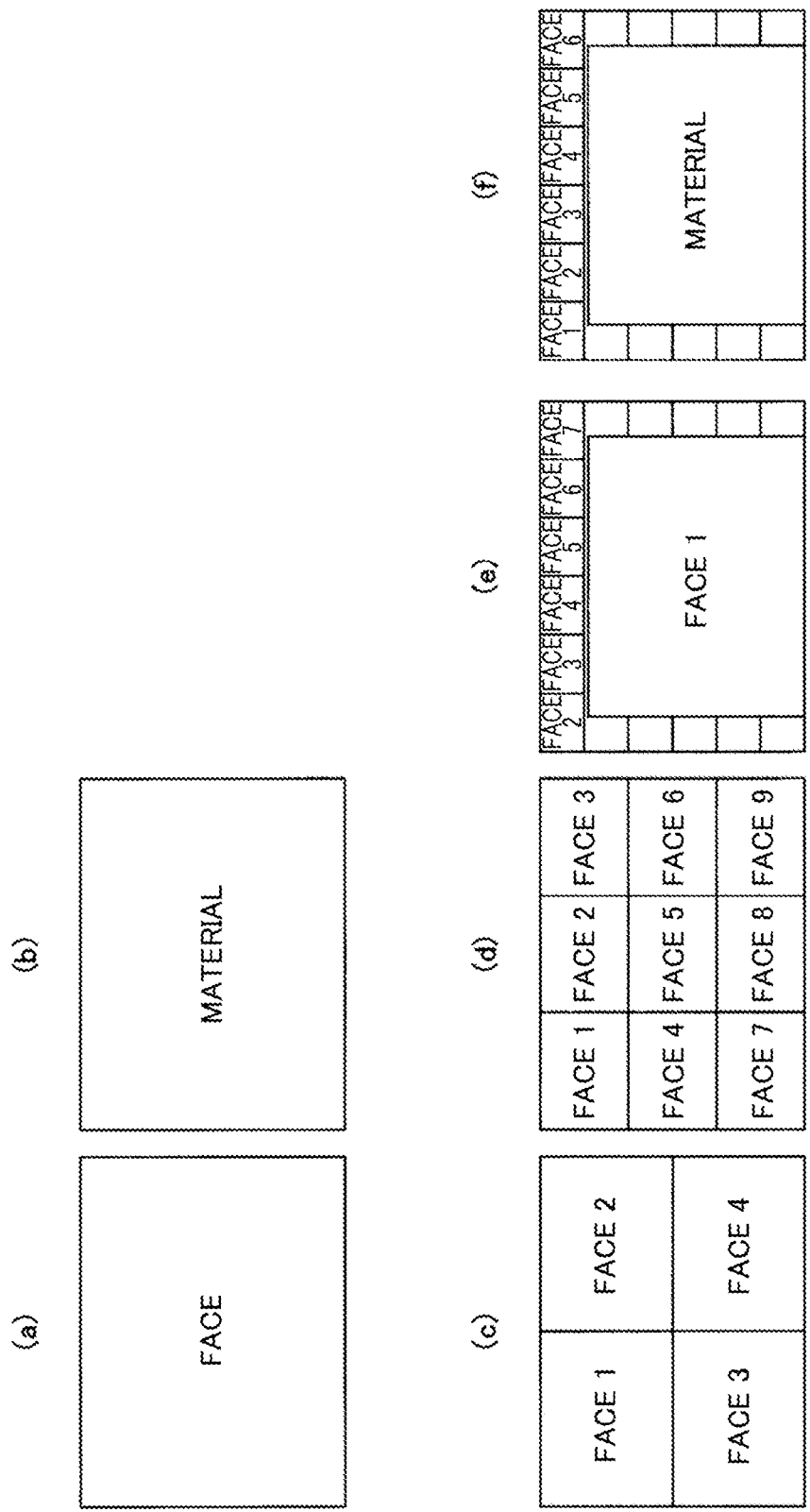
FIG. 2 is a diagram showing examples of screen layouts of a Web conference video.

The second problem is a problem related to a screen layout. FIG. 2 shows examples of screen layouts of a web conference video. In a Web conference, as shown in FIG. 2, in addition to layouts ((a) and (b)) in which a face or a material is displayed on one screen, there are various layouts that combine face videos and material videos, such as layouts ((c) and (d)) in which face videos of a plurality of persons are displayed in a grid shape, and layouts ((e) and (f)) in which a large face video of a main speaker or a material video is displayed, and small face videos of participants are displayed at the top or the like.

In the layouts in which the face videos and the material videos are combined with each other, various parts such as the face videos and the material videos are reduced in size, and are integrated to be displayed as a single video.

Each of the screen layouts shown in FIG. 2 is an example of a screen layout assuming a video of a Web conference.

As described above, the technique according to the present embodiment is applicable to videos other than a web conference video. That is, the technique according to the present embodiment is also applicable to screen layouts in which videos other than face videos and material videos are arranged as parts.

Figure 3:
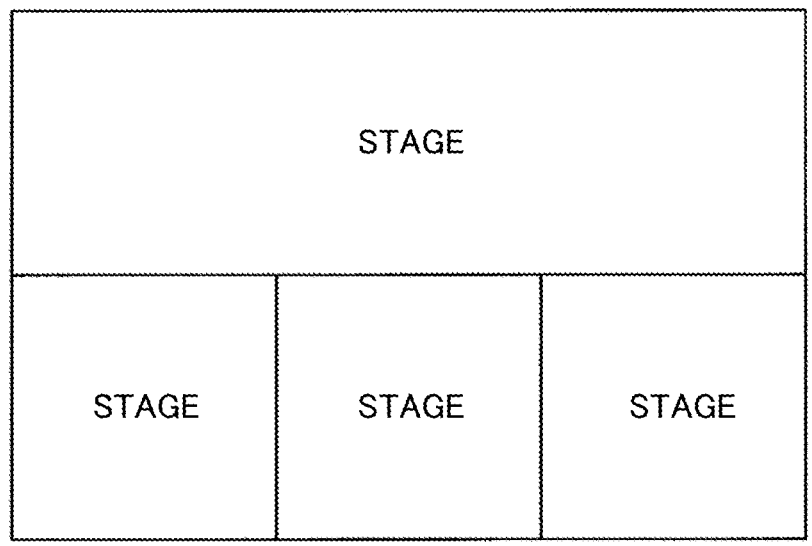
FIG. 3 is a diagram showing an example of a screen layout in which parts are arranged.
Figure 4:
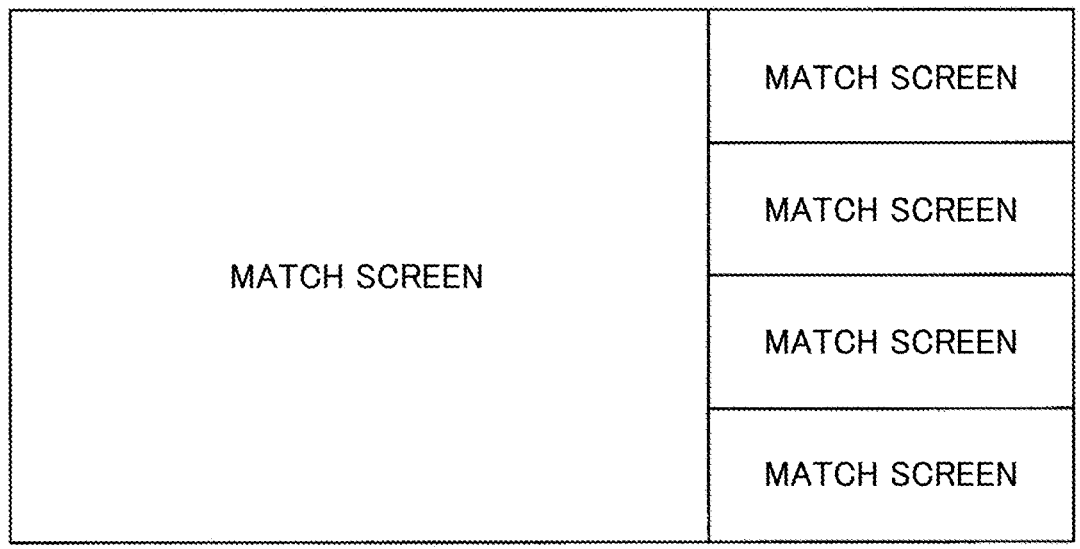
FIG. 4 is a diagram showing an example of a screen layout in which parts are arranged.

For example, the technique according to the present embodiment is also applicable to a screen layout in which a plurality of distributed moving images are simultaneously displayed on one screen and a user can view the plurality of distributed moving images simultaneously. Examples of such distributed moving images include live games, idol lives, sports moving images, and the like. FIGS. 3 to 5 show examples of screen layouts. Also, FIGS. 3 to 5 are examples of screen layouts, and the present invention is not limited thereto.

FIG. 3 shows an example of a screen layout for an idol live. In this example, four videos obtained by shooting a stage from four angles can be viewed simultaneously on four screens. Each of the four videos of the stage of this example is a part.

FIG. 4 shows an example of a screen layout for a sports moving image. In this example, videos of matches held at each venue throughout the country are displayed on each screen divided into five, and the user can view these videos at the same time. Each of the five match screens in this example is a part.

FIG. 5 shows another example of the screen layout for the sports moving image. In this example, four videos obtained by shooting a field from four angles can be viewed simultaneously on four screens. Also, in a region different from a match screen, for example, a country name, information of the team, a score, and the like are displayed. In this example, each match screen and screens of information other than matches are all parts.

In the following, as an example, the technique according to the present embodiment will be described mainly on the assumption of a video of a Web conference as shown in FIG. 2.

Figure 6:
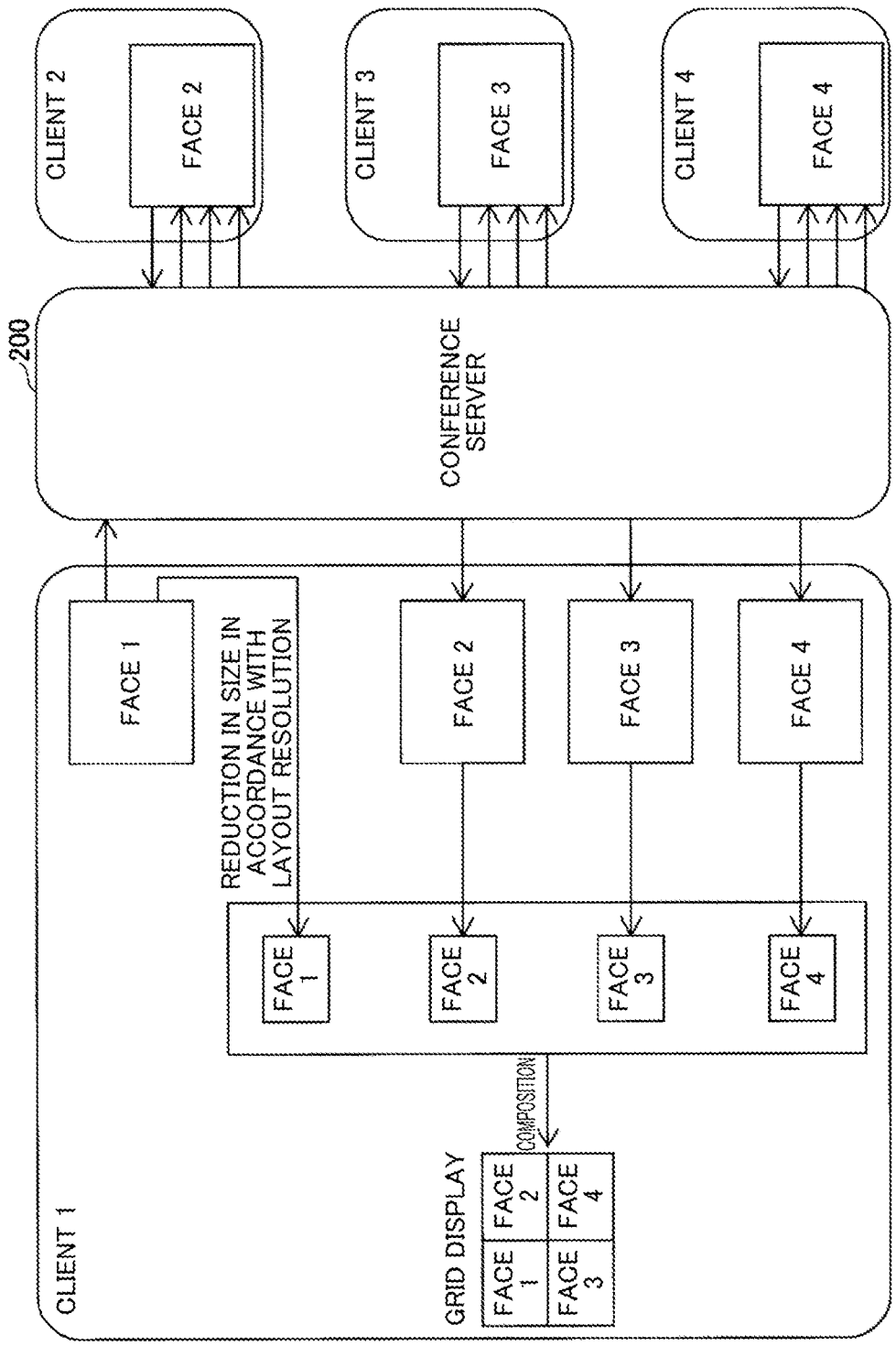
FIG. 6 is a diagram showing an example of a screen layout composition processing image of a Web conference video.

FIG. 6 shows a composite processed image in the case of combining faces of four participants on a grid when a SFU-based Web conference service in which reduction in size and composition of videos on clients are performed is used.

Client 1 acquires face videos of three persons, then reduces their resolutions to match a screen layout (called a layout resolution), and combines them to realize a grid display. For that reason, it is required to construct a quality estimation model reflecting the influence of reduction in size and integration of parts.

Overview of Embodiment

The Web conference video quality estimation apparatus 100 according to the present embodiment performs estimation of the Web conference video quality on the basis of encoding information (a bit rate, a resolution, and a frame rate) and a part type of each part forming a Web conference video, and a resolution of each part at the time of layout composition. More specifically, the processing is performed taking into account the following qualitative characteristics 1 to 3.

Figure 7:
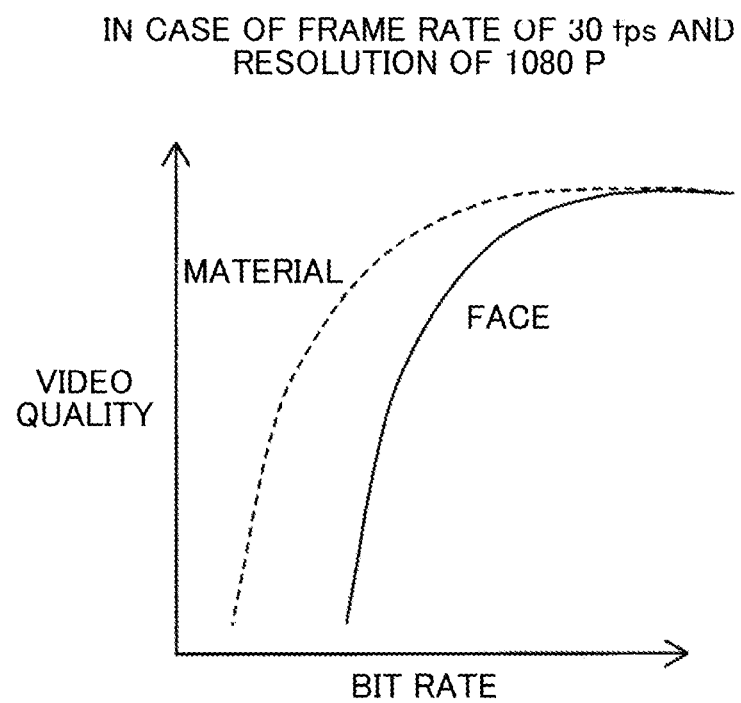
FIG. 7 is a diagram showing examples of encoding characteristics of a face video and a material video.

The characteristic 1 is a characteristic that a video quality of a face video is more likely to be deteriorated by encoding than a material video. FIG. 7 shows an example of the characteristic 1. As shown in FIG. 7, when a bit rate is lowered, a video quality of a face video deteriorates to be lower than that of a material video.

Figure 8:
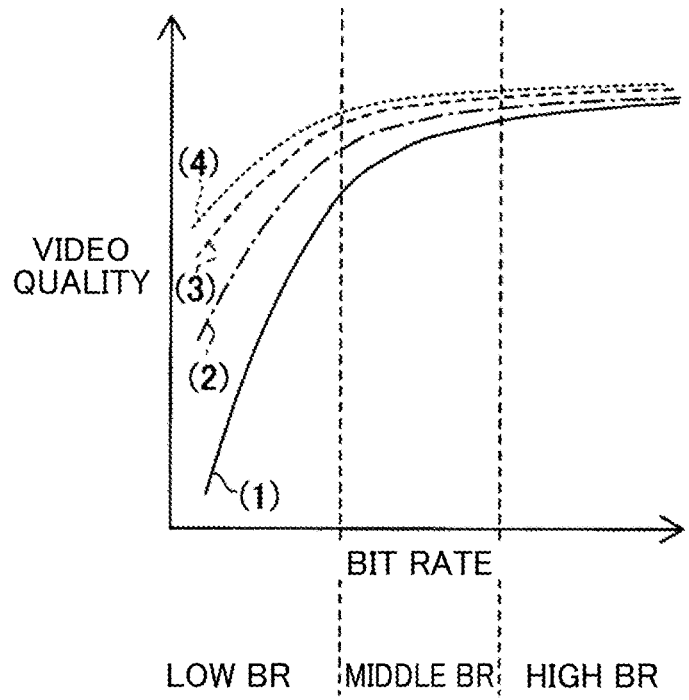
FIG. 8 is a diagram showing examples of influence on the video quality by reducing sizes of parts.

The characteristic 2 is a characteristic that quality deterioration is less likely to be noticed when each part such as a face video and a material video is reduced in size. FIG. 8 shows an example of an effect of reduction in size of parts on the video quality. FIG. 8 shows a relationship between the bit rate and the video quality when a video size (a resolution) is successively reduced from (1) to (4). As shown in FIG. 8, the smaller the size is, the smaller the deterioration of the video quality is with respect to reduction of the bit rate.

Figure 9:
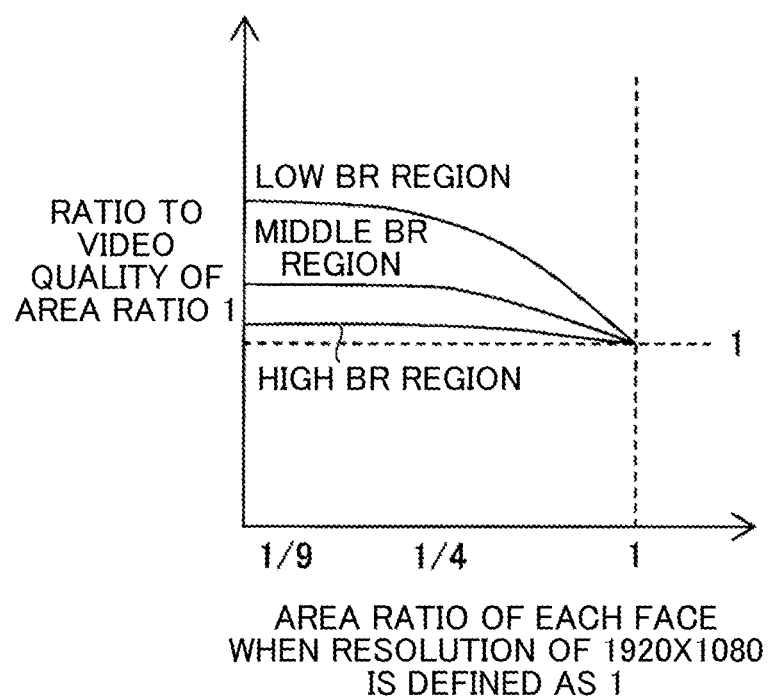
FIG. 9 is a diagram showing an example of a relationship between an area ratio and a video quality of each face for each bit rate region.

Also, FIG. 9 shows an example of a relationship between an area ratio of a face and a video quality for each bit rate region. As shown in FIG. 9, when the area ratio decreases, the video quality increases, but the video quality is saturated at an area ratio of a certain degree or less.

That is, difficulty in noticing the quality deterioration depends on the video quality, and particularly, in a region where the bit rate is low, when the size is reduced, there is a strong tendency to make it difficult to notice the quality deterioration (FIGS. 8 and 9). Further, when the size is reduced to a certain extent, the difficulty in noticing the deterioration is not changed (FIGS. 8 and 9).

The characteristic 3 is a characteristic that a line of sight of a user is likely to be concentrated on a part occupying a wide area such as a material or a speaker. An example of a relationship between a part area and the Web conference video quality in the example of the screen layout of the Web conference shown in FIG. 2(*e*) is shown.

Figure 10:
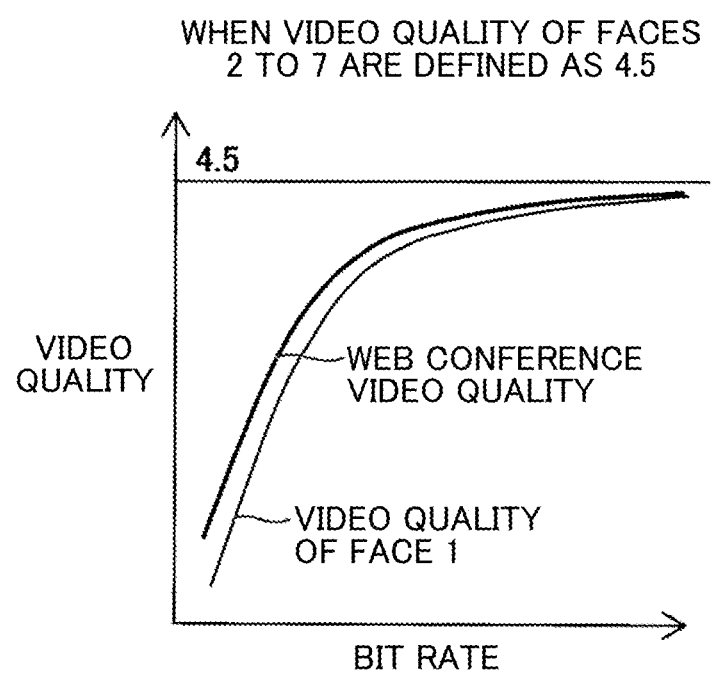
FIG. 10 is a diagram showing an example of a relationship between a part area and a Web conference video quality.
Figure 11:
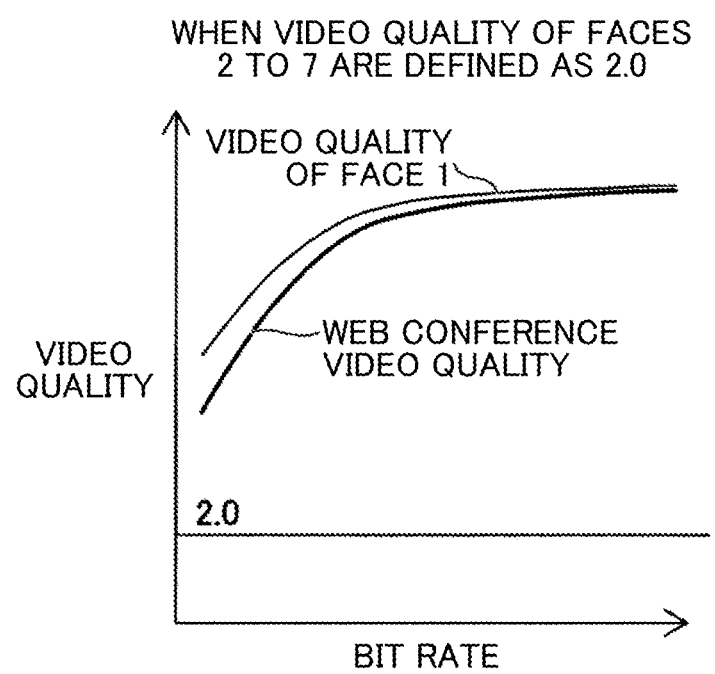
FIG. 11 is a diagram showing an example of a relationship between a part area and a Web conference video quality.

In FIGS. 10 and 11, the bold line indicates the Web conference video quality, and the thin line indicates the video quality of the face 1. Also, FIG. 10 shows a case in which the video quality of each of the faces 2 to 7 is 4.5, and FIG. 11 shows a case in which the video quality of each of the faces 2 to 7 is 2.0.

As shown in FIG. 10, even if the video quality of the parts having a narrow upper area in FIG. 2(*e*) is high, the Web conference video quality decreases as quality of the part occupying a wide area decreases. Further, as shown in FIG. 11, even if the video quality of the parts having a narrow upper area is low, a degree of deterioration in the Web conference video quality is small.

(Example of Apparatus Configuration)

The Web conference video quality estimation apparatus 100 according to the present embodiment takes into consideration at least one of the above characteristics 1 to 3, receives inputs of the encoding information (a bit rate, a resolution, and a frame rate) of each part forming the Web conference video, the part type of each part forming the Web conference video, and the resolution of each part at the time of layout composition, and derives the Web conference video quality.

Figure 12:
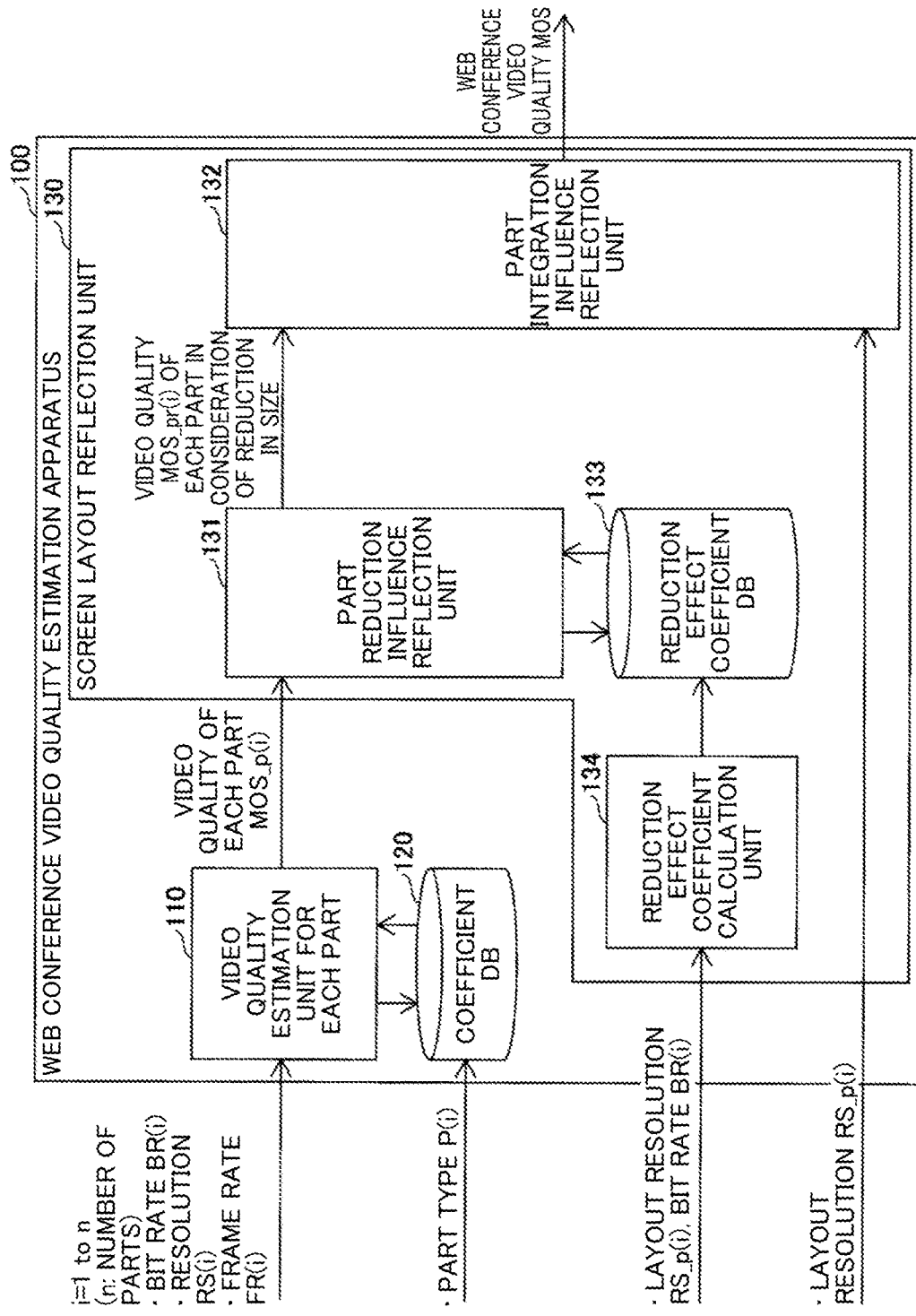
FIG. 12 is a diagram showing a configuration example of a Web conference video quality estimation apparatus according to an embodiment of the present invention.

FIG. 12 shows a configuration example of the Web conference video quality estimation apparatus 100 according to the present embodiment. As shown in FIG. 12, the Web conference video quality estimation apparatus 100 includes a video quality estimation unit 110 for each part, a coefficient DB 120, and a screen layout reflection unit 130.

The video quality estimation unit 110 for each part is a functional unit for estimating the Web conference video quality on the basis of the characteristic 1, receives inputs of the bit rate, the resolution, the frame rate, and the part type for each part forming the Web conference video, and outputs the video quality of each part for all parts.

The screen layout reflection unit 130 is a functional unit for estimating the Web conference video quality on the basis of the characteristics 2 and 3. More specifically, the screen layout reflection unit 130 includes a part reduction influence reflection unit 131, a reduction effect coefficient calculation unit 134, and a reduction effect coefficient DB 133 for estimating the Web conference video quality on the basis of the characteristic 2, and includes a part integration influence reflection unit 132 for estimating Web conference video quality on the basis of the characteristic 3.

The part reduction influence reflection unit 131 receives inputs of the video quality of each part for all parts and derives the video quality of each part in consideration of reduction in size of each part. The part integration influence reflection unit 132 receives inputs of the video quality of each part in consideration of reduction in size of all parts and the resolution of each part at the time of layout composition and derives the Web conference video quality.

Also, the coefficient DB 120 stores coefficients of a video quality estimation model used for estimating the video quality of each part by the video quality estimation unit 110 for each part.

The reduction effect coefficient DB 133 stores coefficients used for estimating the video quality of each part in consideration of the reduction in size in the part reduction influence reflection unit 131. The reduction effect coefficient calculation unit 134 calculates the coefficients.

(Operation Example of Web Conference Video Quality Estimation Apparatus 100)

An operation example of the Web conference video quality estimation apparatus 100 shown in FIG. 12 will be described. The Web conference video quality estimation apparatus 100 estimates and outputs quality of a Web conference video displayed on a terminal 10. Inputs are a bit rate BR(i), a resolution RS(i), a frame rate FR(i), a part type P(i), and a layout resolution RS_p(i) in the Web conference video displayed on the terminal 10, and an output is a video quality MOS of the Web conference video displayed on the terminal 10.

The Web conference video quality estimation apparatus 100 may acquire input data from the terminal 10, may acquire input data from the conference server 200, may acquire input data from a communication packet between the terminal 10 and the conference server 200, or may acquire input data by other methods.

Also, the Web conference video quality estimation apparatus 100 may visualize and display the estimated quality of the Web conference video on a display of the Web conference video quality estimation apparatus 100, or may display the estimated quality of the Web conference video on a remote management terminal or the like serving as a Web screen.

An operation example of the Web conference video quality estimation apparatus 100 will be described in more detail below in accordance with the procedure of the flowchart in FIG. 13. In addition, in the following processing, each part is assumed to be a face video or a material video. However, it is an example that each part is a face video or a material video, and the application range of the present invention is not limited to the face video or the material video.

<S101: Video Quality Estimation for Each Part>

In S101, first, the video quality estimation unit 110 for each part receives inputs of the bit rate BR(i), the resolution RS(i), and the frame rate FR(i) for each part i (i=1 to n, where n is the number of parts) and outputs the video quality MOS_p(i) for each part for all parts. The resolution RS(i) is a resolution before the reduction in size for layout. In order to estimate the video quality of each part, for example, the video quality estimation model disclosed in Reference 1 "Parametric bitstream-based quality assessment of progressive download and adaptive audiovisual streaming services over reliable transport, Recommendation ITU-T P. 1203, 2017," or the like may be used.

In addition, in order to reflect the characteristic 1, coefficients of the video quality estimation model such as Reference 1 are determined on the basis of results of Web conference video quality evaluation experiments performed in advance and stored in the coefficient DB 120. In the estimation of the video quality of each part performed by the video quality estimation unit 110 for each part, a coefficient corresponding to the part type P(i) is selected from the coefficient DB 120 and reflected in the video quality estimation model such as Reference 1 to estimate the video quality of each part. Also, the part type P(i) indicates that it is either a face video or a material video.

<S102: Video Quality Estimation for Each Part in Consideration of Reduction in Size>

Figure 14:
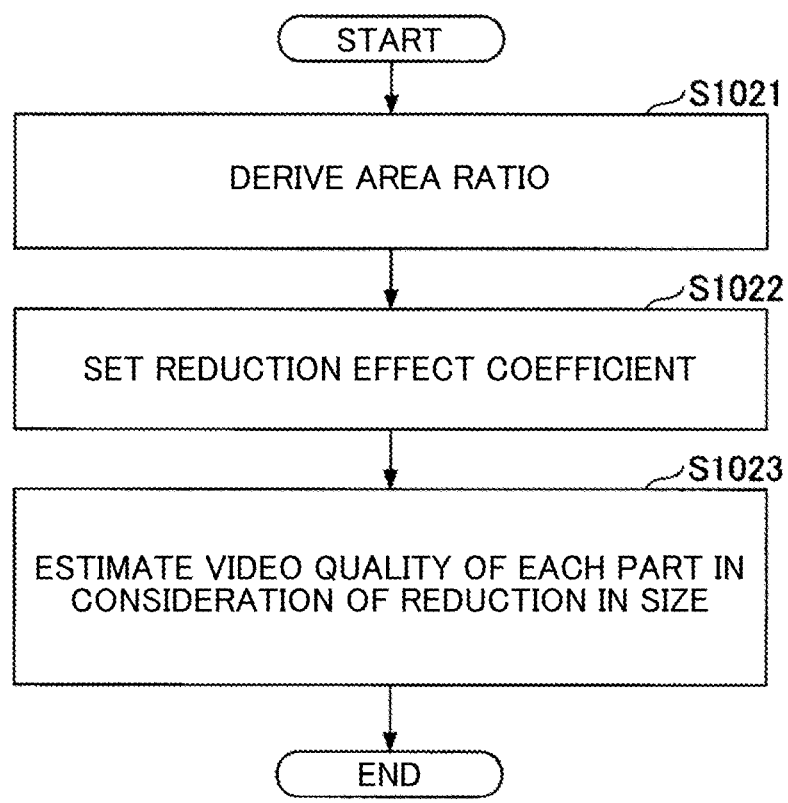
FIG. 14 is a diagram showing an example of a processing flow for estimating the video quality of each part in consideration of reduction in size.

In S102, the part reduction influence reflection unit 131 of the screen layout reflection unit 130 receives inputs of the video quality MOS_p(i) of each part for all parts and derives the video quality MOS_pr(i) in consideration of the reduction in size for each part by using a reduction effect coefficient. The content of processing in S102 will be described with reference to the flowchart of FIG. 14. In the following formulas with i, i=1 to n, where n is the number of parts.

In S1021, the reduction effect coefficient calculation unit 134 derives an area ratio RS_r(i) for each part from the layout resolution RS_p(i) for each part using the following formula (1). Here, RS_b indicates a resolution (a reference resolution) for one-screen display. RS_b may be a predetermined value or a value included in input data. Also, the formula (1) is only an example, and other formulas may be used as long as they can take into account the influence of reduction in size.

$$RS\_r(i) = RS\_p(i)/RS\_b \tag{1}$$

In S1022, the reduction effect coefficient calculation unit 134 reflects characteristics of FIG. 9 that "when the area ratio of each part when the resolution 1920×1080 is defined as 1" becomes smaller, "the quality becomes higher than the video quality of the area ratio 1," and the video quality is saturated at an area ratio of a certain degree or less, and thus the reduction effect coefficient re(i) is derived from the irrational formula (2). The derived reduction effect coefficient re(i) is stored in the reduction effect coefficient DB 133. Also, the formula (2) is an example, and other formulas may be used as long as they can reflect the characteristics of FIG. 9.

$$re(i) = a*(1 - RS\_r(i))^{\wedge}(1/2) \tag{2}$$

The coefficient a in formula (2) is determined for each bit rate region on the basis of the results of the Web conference video quality evaluation experiments performed in advance and stored in the reduction effect coefficient DB 133. In the case of calculating the reduction effect coefficient for a part whose bit rate is BR(i), the reduction effect coefficient calculation unit 134 reads the coefficient a corresponding to the bit rate region of BR(i) from the reduction effect coefficient DB 133 and uses it.

In S1023, the part reduction influence reflection unit 131 receives inputs of the video quality MOS_p(i) of each part and the reduction effect coefficient re(i) read from the reduction effect coefficient DB 133 and derives the video quality MOS_pr(i) of each part in consideration of the reduction in size using the following formula (3). Also, the formula (3) is only an example, and other formulas may be used as long as they can take into account the influence of the reduction in size.

$$MOS\_pr(i) = re(i)*MOS\_p(i) \tag{3}$$

<S103: Web Conference Video Quality Estimation>

Figure 13:
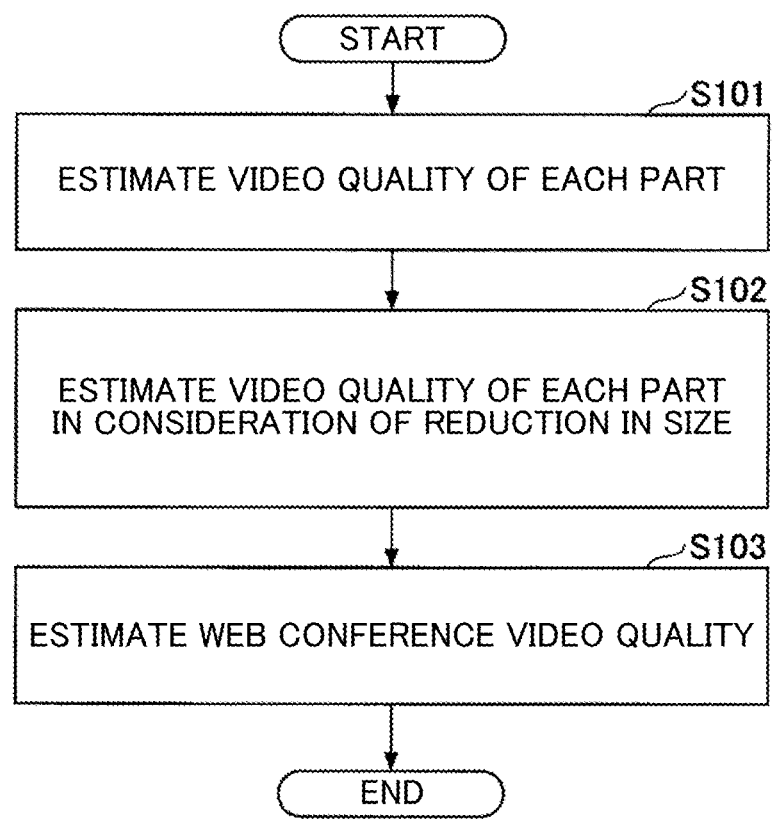
FIG. 13 is a diagram showing an example of an overall processing flow of the Web conference video quality estimation apparatus.

In S103 in FIG. 13, the part integration influence reflection unit 132 receives inputs of the video quality MOS_pr(i) and the layout resolution RS_p(i) of each part in consideration of the reduction in size for all parts and derives the web conference video quality MOS.

The Web conference video quality MOS is derived by integrating the video quality MOS_pr(i) of each part in consideration of the reduction in size by the following formula (4) considering the characteristics of FIGS. 10 and 11 that the Web conference video quality MOS is easily affected by a video quality of a part occupying a wide area, and considering the area ratio of a part to the whole screen. "RS_p(i)/$\Sigma_{k=1}^{n}$RS_p(i)" in the formula (4) corresponds to the above-mentioned area ratio.

Also, the formula (4) is only an example, and other formulas may be used as long as they can reflect the characteristics of FIGS. 10 and 11.

[Formula 1]

$$MOS = \sum_{i=1}^{n} \left( \frac{RS\_p(i)}{\sum_{k=1}^{n} RS\_p(k)} \times MOS\_pr(i) \right) \tag{4}$$

As the configuration of the Web conference video quality estimation apparatus 100, the configuration shown in FIG. 12 is an example, and it is also possible to use configurations of the following modified examples 1 to 3.

Modified Example 1

Figure 15:
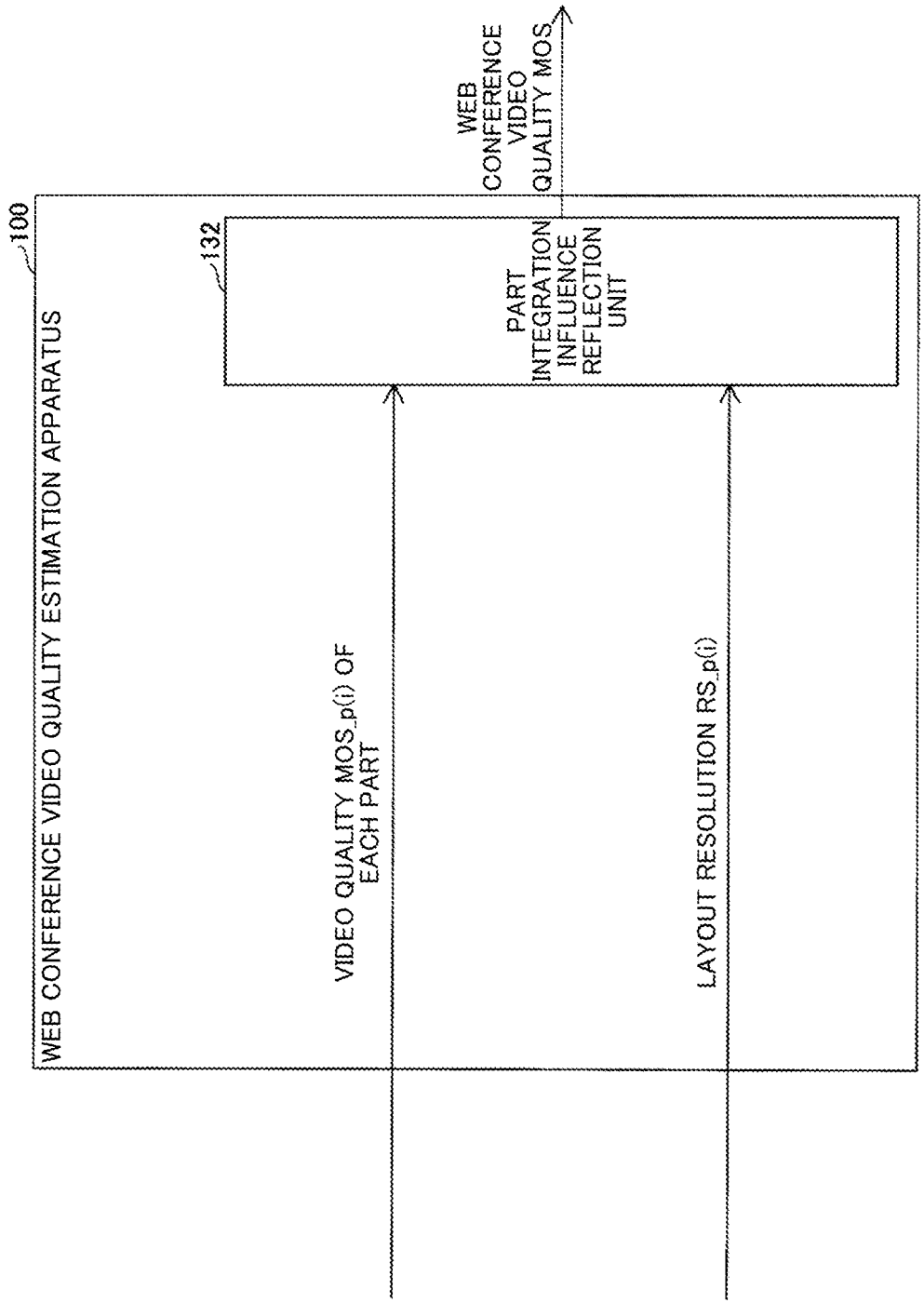
FIG. 15 is a diagram showing a configuration example of a Web conference video quality estimation apparatus according to Modified Example 1.

FIG. 15 shows a configuration of a Web conference video quality estimation apparatus 100 according to Modified Example 1. As shown in FIG. 15, the Web conference video quality estimation apparatus 100 according to Modified Example 1 includes a part integration influence reflection unit 132. The part integration influence reflection unit 132 estimates Web conference video quality on the basis of the characteristic 3.

In Modified Example 1, the video quality MOS_p(i) of each part and the layout resolution RS_p(i) of each part in a video serving as a quality estimation target are input into the Web conference video quality estimation apparatus 100. In the Web conference video quality estimation apparatus 100, the video quality MOS_p(i) and the layout resolution RS_p(i) are input into the part integration influence reflection unit 132. The video quality MOS_p(i) of each part is a video quality estimated by an existing technique (for example, Reference 1).

The part integration influence reflection unit 132 derives and outputs the Web conference video quality MOS by integrating the video quality MOS_p(i) using a formula obtained by replacing MOS_pr(i) with MOS_p(i) in the above formula (4).

Modified Example 2

Figure 16:
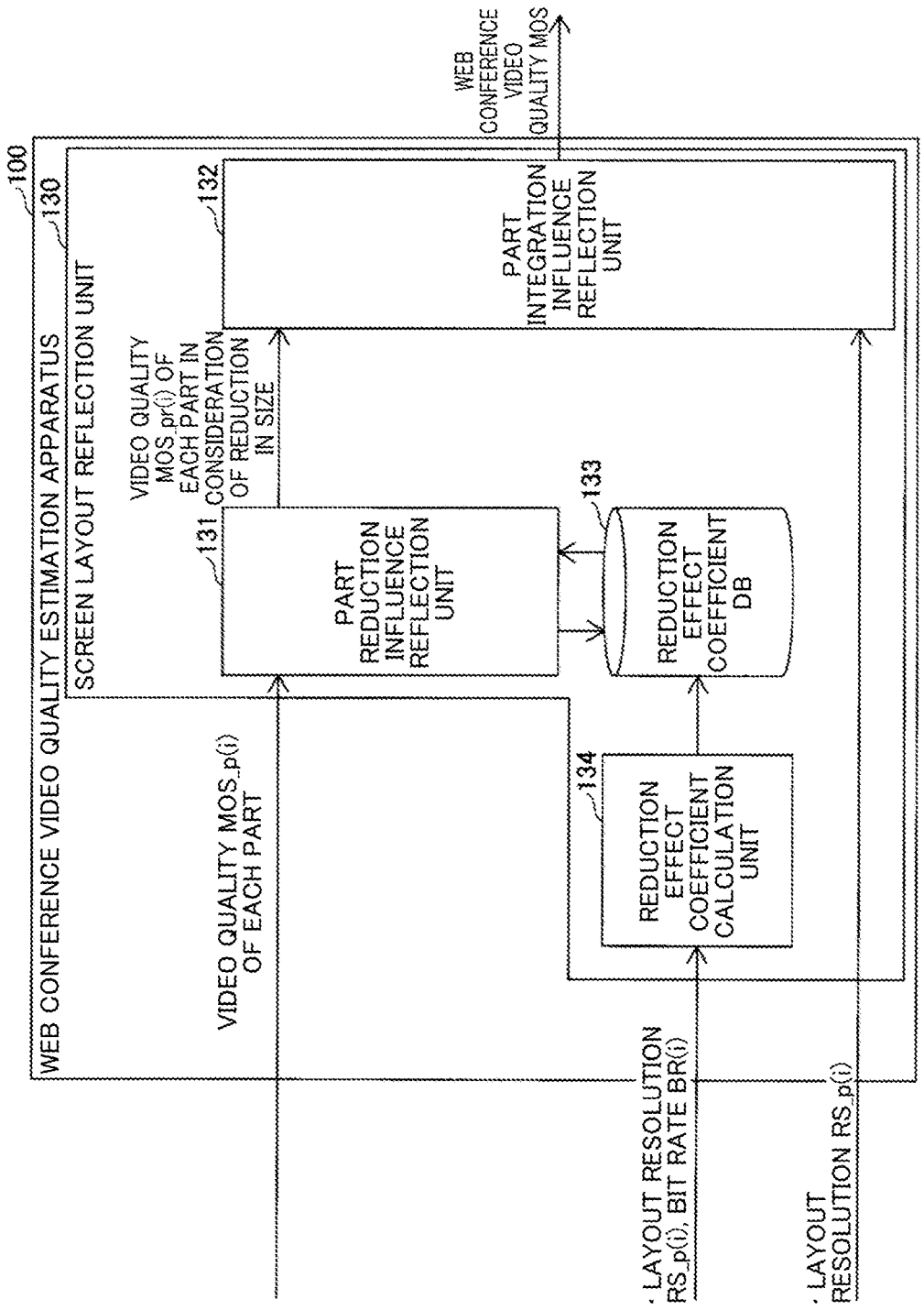
FIG. 16 is a diagram showing a configuration example of a Web conference video quality estimation apparatus according to Modified Example 2.

FIG. 16 shows a configuration of a Web conference video quality estimation apparatus 100 according to Modified Example 2. As shown in FIG. 16, the Web conference video quality estimation apparatus 100 according to Modified Example 2 corresponds to a configuration in which the video quality estimation unit 110 for each part and the coefficient DB 120 are removed from the Web conference video quality estimation apparatus 100 shown in FIG. 12.

In Modified Example 2, the video quality estimated by the existing technique (for example, Reference 1) is used as the video quality MOS_p(i) of each part. Except for this point, the Web conference video quality estimation apparatus 100 according to Modified Example 2 is the same as the Web conference video quality estimation apparatus 100 shown in FIG. 12.

Modified Example 3

Figure 17:
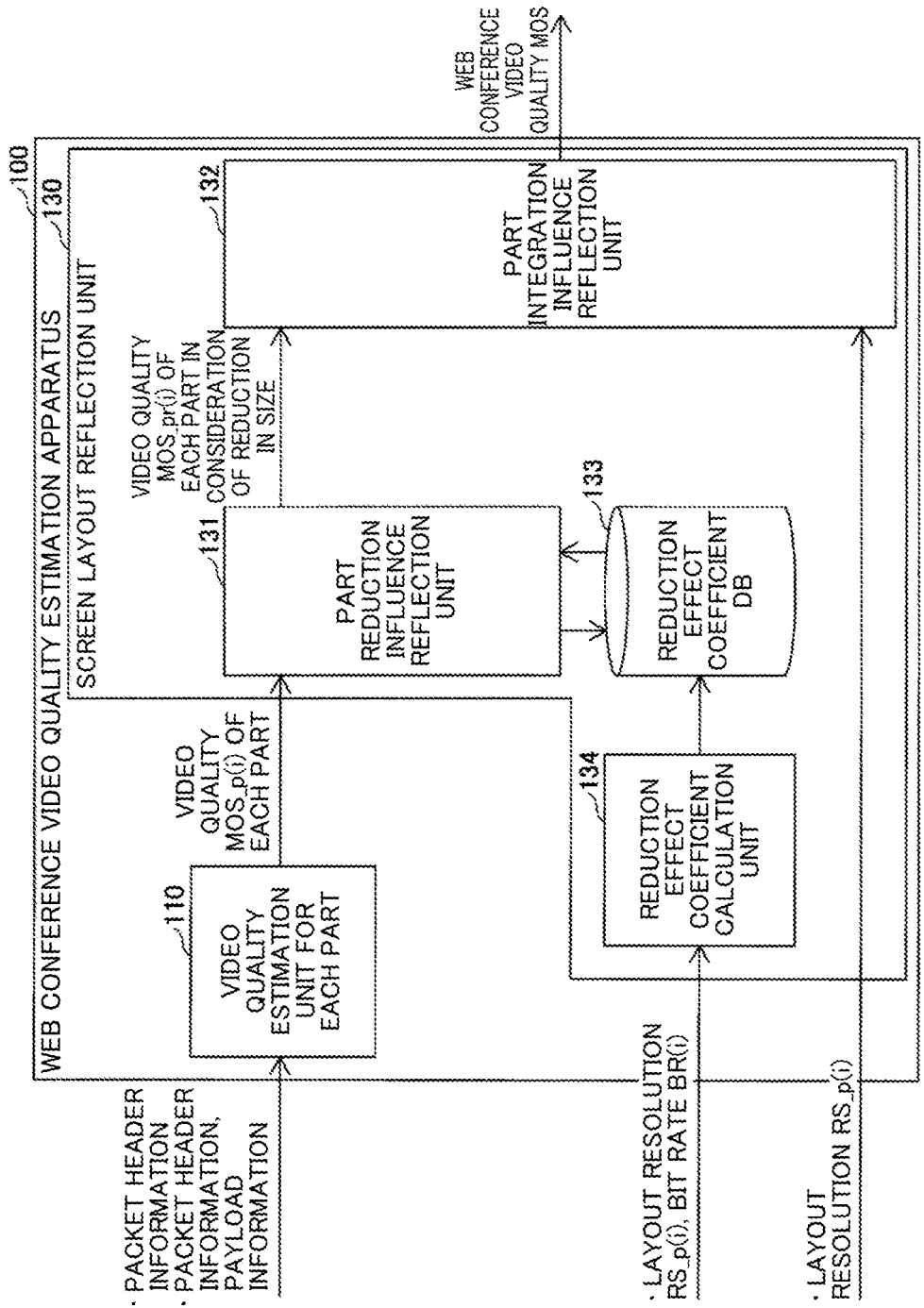
FIG. 17 is a diagram showing a configuration example of a Web conference video quality estimation apparatus according to Modified Example 3.

FIG. 17 shows a configuration of a Web conference video quality estimation apparatus 100 according to Modified Example 2. As shown in FIG. 17, the Web conference video quality estimation apparatus 100 according to Modified Example 3 corresponds to a configuration in which the coefficient DB 120 is removed from the Web conference video quality estimation apparatus 100 shown in FIG. 12.

In Modified Example 3, a method for estimating the video quality MOS_p(i) of each part performed by the video quality estimation unit 110 for each part is different from the method for estimating the video quality of the Web conference video quality estimation apparatus 100 shown in FIG. 12. Except for this point, the Web conference video quality estimation apparatus 100 according to Modified Example 3 is the same as the Web conference video quality estimation apparatus 100 shown in FIG. 12.

That is, in the Web conference video quality estimation apparatus 10 shown in FIG. 12, the video quality of each part is estimated by using a parametric objective evaluation model, but in Modified Example 3, the video quality of each part can be estimated by using a packet layer objective evaluation technique or a bit stream layer objective evaluation technique.

In the case of using a packet layer objective evaluation technique, the video quality estimation unit 110 for each part receives inputs of packet header information such as IP and RTP in a video serving as an evaluation target, and estimates and outputs the video quality MOS_p(i) of each part by using a packet layer model.

In the case of using a bit stream layer objective evaluation technique, the video quality estimation unit 110 for each part receives inputs of payload information (encoded bit sequence information before decoding) in addition to packet header information in a video serving as an evaluation target, and estimates and outputs the video quality MOS_p(i) of each part using a bit stream layer model.

Example of Hardware Configuration

The Web conference video quality estimation apparatus 100 can be realized, for example, by causing a computer to execute a program. The computer may be a physical computer or a virtual machine on a cloud.

That is, the Web conference video quality estimation apparatus 100 can be realized by executing a program corresponding to the processing performed by the Web conference video quality estimation apparatus 100 using hardware resources such as a CPU and a memory built into a computer. The above program can be recorded on a computer-readable recording medium (a portable memory or the like) to be stored or distributed. It is also possible to provide the above program via a network such as the Internet or an electronic mail.

Figure 18:
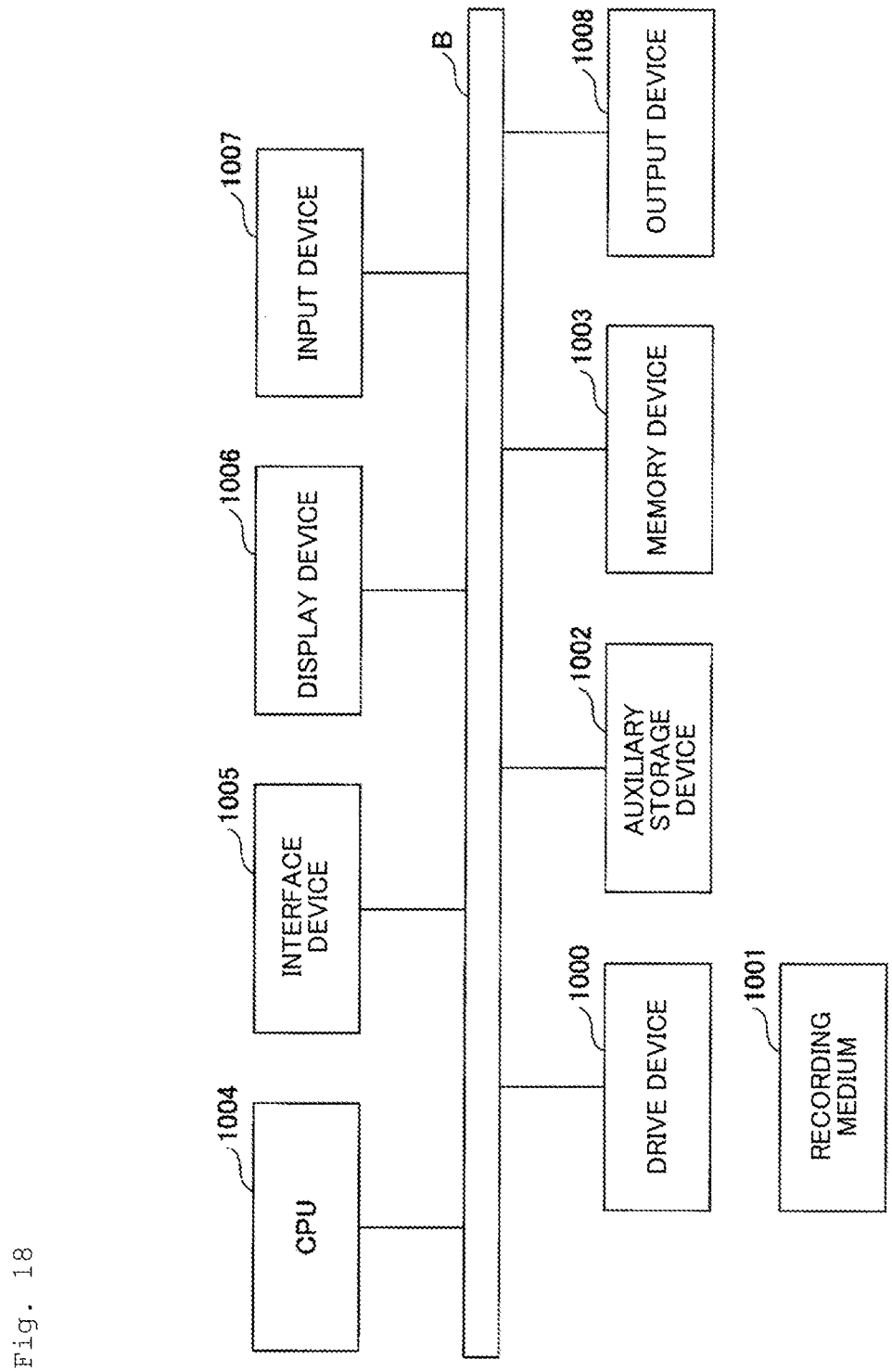
FIG. 18 is a diagram showing an example of a hardware configuration of a device.

FIG. 18 is a diagram showing an example of a hardware configuration of the above computer. The computer of FIG. 18 includes a drive device 1000, an auxiliary storage device 1002, a memory device 1003, a CPU 1004, an interface device 1005, a display device 1006, an input device 1007, an output device 1008, and the like, which are connected to each other by a bus B.

A program that executes processing in the computer is provided by, for example, a recording medium 1001 such as a CD-ROM or a memory card. When the recording medium 1001 having the program stored therein is set in the drive device 1000, the program is installed in the auxiliary storage device 1002 from the recording medium 1001 via the drive device 1000. However, the program need not necessarily be installed from the recording medium 1001 and may be downloaded from another computer via a network. The auxiliary storage device 1002 stores the installed program and also stores necessary files, data, and the like.

The memory device 1003 reads and stores the program from the auxiliary storage device 1002 when an instruction to start the program is given. The CPU 1004 executes functions of the Web conference video quality estimation apparatus 100 in accordance with the program stored in the memory device 1003. The interface device 1005 is used as an interface for connection to a network or the like. The display device 1006 displays a graphical user interface (GUI) and the like in accordance with the program. The input device 1007 is configured of a keyboard, a mouse, buttons, a touch panel, or the like and is used to input various operation instructions. The output device 1008 outputs computation results.

Effects of Embodiment

According to the technique according to the present embodiment, it is possible to highly accurately estimate the quality of the video having a screen layout in which parts are arranged. For example, the video quality in the Web conference can be estimated with high accuracy. For example, a Web conference service provider can visualize the Web conference video quality on the basis of encoding quality and screen layout information of a service being provided, and can improve the encoding quality affecting the Web conference video quality on the basis of the visualized information, thereby realizing maintenance and improvement of the Web conference video quality.

Supplements

The present specification discloses, at least, the following video quality estimation apparatus, video quality estimation method, and program.

Supplement 1

A video quality estimation apparatus that estimates a video quality of a video having a screen layout in which parts are arranged, in which
the video quality of the video is estimated based on a video quality of each of the parts forming the video and a layout resolution of each of the parts on the screen layout.

Supplement 2

A video quality estimation apparatus that estimates a video quality of a video having a screen layout in which parts are arranged, the video quality estimation apparatus including:
a memory; and
at least one processor coupled to the memory,
in which
the processor
estimates the video quality of the video based on a video quality of each of the parts forming the video and a layout resolution of each of the parts on the screen layout.

Supplement 3

A video quality estimation apparatus that estimates a video quality of a video having a screen layout in which parts are arranged, including:
a memory; and
at least one processor coupled to the memory,
in which
the processor
estimates a video quality of each of the parts forming the video, and
estimates the video quality of the video based on the estimated video quality of each of the parts and a layout resolution of each of the parts on the screen layout.

Supplement 4

A video quality estimation apparatus that estimates a video quality of a video having a screen layout in which parts are arranged, the video quality estimation apparatus including:
a memory; and
at least one processor coupled to the memory,
in which
the processor
estimates a video quality of each of the parts based on encoding information and a part type of each of the parts forming the video, and
estimates the video quality of the video based on the estimated video quality of each of the parts and a layout resolution of each of the parts on the screen layout.

Supplement 5

A video quality estimation apparatus that estimates a video quality of a video having a screen layout in which a plurality of parts are arranged, the video quality estimation apparatus including:
a memory; and
at least one processor coupled to the memory,
in which
the processor
estimates a video quality of each of the parts based on encoding information and a part type of each of the parts forming the video, and
estimates the video quality of the video based on the video quality of each of the parts estimated by the video quality estimation unit and a layout resolution of each of the parts on the screen layout.

Supplement 6

The video quality estimation apparatus described in Supplement 5, in which the processor estimates the video quality of each of the parts by using a video quality estimation model reflecting a coefficient corresponding to the part type.

Supplement 7

The video quality estimation apparatus according to Supplement 5 or 6, in which the processor calculates a video quality reflecting an influence of reduction in size of each of the parts to form the screen layout, and calculates the video quality of the video by reflecting an influence of integration of a plurality of parts forming the screen layout.

Supplement 8

The video quality estimation apparatus according to Supplement 7, in which the processor calculates the video quality of each of the parts in consideration of the reduction in size by using a reduction effect coefficient that is set based on a relationship between an area ratio of each of the parts to a whole screen, a bit rate of each of the parts, and the video quality of each of the parts.

Supplement 9

The video quality estimation apparatus according to Supplement 7 or 8, in which the processor calculates the video quality of the video by integrating the video quality of each of the parts in consideration of the reduction in size while taking the area ratio of each of the parts to a whole screen into consideration.

Supplement 10

A video quality estimation method executed by a video quality estimation apparatus that estimates video quality of a video having a screen layout in which parts are arranged, the video quality estimation method including
estimating the video quality of the video based on a video quality of each of the parts forming the video and a layout resolution of each of the parts on the screen layout.

Supplement 11

A non-transitory storage medium storing a program for causing a computer to function as the video quality estimation apparatus according to any one of Supplements 1 to 9.

Although the present embodiment has been described above, the present invention is not limited to the specific embodiment, and various modifications and changes can be made within the scope of the gist of the present invention described in the claims.

This patent application claims its priority on the basis of International Patent Application No. PCT/JP2021/030205 filed on Aug. 18, 2021, and the entire content of International Patent Application No. PCT/JP2021/030205 is incorporated in the present application.

REFERENCE SIGNS LIST

10 Terminal
100 Web conference video quality estimation apparatus
110 Video quality estimation unit for each part
120 Coefficient DB
130 Screen layout reflection unit
131 Part reduction influence reflection unit
132 Part integration influence reflection unit
133 Reduction effect coefficient DB
134 Reduction effect coefficient calculation unit
200 Conference server
300 Network
1000 Drive device
1001 Recording medium
1002 Auxiliary storage device
1003 Memory device
1004 CPU
1005 Interface device
1006 Display device
1007 Input device
1008 Output device

The invention claimed is:

1. A video quality estimation apparatus that estimates a video quality of a video having a screen layout in which parts are arranged, the video quality estimation apparatus comprising:
a processor; and
a memory storing program instructions that cause the processor to:
estimate a video quality of each of the parts forming the video; and
estimate the video quality of the video based on the estimated video quality of each of the parts and a layout resolution of each of the parts on the screen layout, said layout resolution being determined based on a relative size of each of the parts within a display,
wherein the program instructions cause the processor to:
calculate, for each of the parts, a video quality reflecting an influence of reduction in size of each of the parts to form the screen layout, said influence of reduction in size of each of the parts being defined by a degree of deterioration of the video quality, for each of the parts with different sizes, that is caused by reduction of bit rate; and
calculate the video quality of the video by reflecting an influence of integration of the plurality of parts forming the screen layout, said influence of the integration of the plurality of parts being defined by a degree of deterioration of the video quality that is caused by integrating video quality of each of the parts.

2. A video quality estimation apparatus that estimates a video quality of a video having a screen layout in which a plurality of parts are arranged, the video quality estimation apparatus comprising:
a processor; and
a memory storing program instructions that cause the processor to:
estimate a video quality of each of the parts based on encoding information and a part type of each of the parts forming the video, said part type being defined as a category of an object that is displayed as each of the parts; and
estimate the video quality of the video based on the estimated video quality of each of the parts and a layout resolution of each of the parts on the screen layout, said layout resolution being determined based on a relative size of each of the parts within a display,
wherein the program instructions cause the processor to:
calculate, for each of the parts, a video quality reflecting an influence of reduction in size of each of the parts to form the screen layout, said influence of reduction in size of each of the parts being defined by a degree of deterioration of the video quality, for each of the parts with different sizes, that is caused by reduction of bit rate; and
calculate the video quality of the video by reflecting an influence of integration of the plurality of parts forming the screen layout, said influence of the integration of the plurality of parts being defined by a degree of deterioration of the video quality that is caused by integrating video quality of each of the parts.

3. The video quality estimation apparatus according to claim 2, wherein the program instructions cause the processor to estimate the video quality of each of the parts by using a video quality estimation model reflecting a coefficient corresponding to the part type, said coefficient being coefficient of the video quality estimation model used for estimating the video quality of each of the parts.

4. The video quality estimation apparatus according to claim 1, wherein the program instructions cause the processor to calculate the video quality of each of the parts in consideration of the reduction in size by using a reduction effect coefficient that is set based on a relationship between an area ratio of each of the parts to a whole screen, a bit rate of each of the parts, and the video quality of each of the parts.

5. The video quality estimation apparatus according to claim 1, wherein the program instructions cause the processor to calculate the video quality of the video by integrating the video quality of each of the parts in consideration of the reduction in size, while considering the area ratio of each of the parts to a whole screen.

6. A video quality estimation method executed by a video quality estimation apparatus that estimates a video quality of a video having a screen layout in which parts are arranged, the video quality estimation method comprising:

estimating the video quality of the video based on a video quality of each of the parts forming the video and a layout resolution of each of the parts on the screen layout, said layout resolution being determined based on a relative size of each of the parts within a display, wherein the video quality estimation method further comprises:

calculating, for each of the parts, a video quality reflecting an influence of reduction in size of each of the parts to form the screen layout, said influence of reduction in size of each of the parts being defined by a degree of deterioration of the video quality, for each of the parts with different sizes, that is caused by reduction of bit rate; and calculating the video quality of the video by reflecting an influence of integration of the plurality of parts forming the screen layout, said influence of the integration of the plurality of parts being defined by a degree of deterioration of the video quality that is caused by integrating video quality of each of the parts.

7. A non-transitory computer-readable recording medium storing a program for causing a computer to perform the video quality estimation method of claim 6.

8. The video quality estimation apparatus according to claim 2, wherein the layout resolution is a resolution of each of the parts that is obtained by adjusting an original resolution of each of the parts based on the relative size of each of the parts within the display.

* * * * *